(12) United States Patent
Watson (10) Patent No.: US 9,292,056 B2
(45) Date of Patent: Mar. 22, 2016

(54) SYSTEMS AND METHODS FOR WIRELESS COMMUNICATION OF POWER DISTRIBUTION INFORMATION

(75) Inventor: Steven M. Watson, St. Louis, MO (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 473 days.

(21) Appl. No.: 13/193,109

(22) Filed: Jul. 28, 2011

(65) Prior Publication Data

US 2013/0031399 A1    Jan. 31, 2013

(51) Int. Cl.
| | |
|---|---|
| G06F 1/00 | (2006.01) |
| G06F 1/18 | (2006.01) |
| G06F 1/32 | (2006.01) |
| G06F 1/26 | (2006.01) |

(52) U.S. Cl.
CPC ......... *G06F 1/189* (2013.01); *G06F 1/26* (2013.01); *G06F 1/3206* (2013.01); *G06F 1/3209* (2013.01)

(58) Field of Classification Search
CPC ....... G06F 1/3209; G06F 1/3206; G06F 1/28; G06F 1/189
USPC ........................................................ 713/340
See application file for complete search history.

(56) References Cited

U.S. PATENT DOCUMENTS

| | | | | |
|---|---|---|---|---|
| 6,741,442 | B1 * | 5/2004 | McNally et al. | 361/166 |
| 7,860,955 | B2 * | 12/2010 | Ratcliff et al. | 709/220 |
| 2005/0076251 | A1 | 4/2005 | Barr et al. | |
| 2005/0203987 | A1 * | 9/2005 | Ewing et al. | 709/200 |
| 2008/0104614 | A1 | 5/2008 | Arnez et al. | |
| 2008/0203987 | A1 * | 8/2008 | Lee | 323/282 |
| 2008/0215727 | A1 * | 9/2008 | Denis et al. | 709/224 |
| 2009/0013210 | A1 | 1/2009 | McIntosh et al. | |
| 2009/0045803 | A1 | 2/2009 | Schoettle | |
| 2009/0309570 | A1 * | 12/2009 | Lehmann et al. | 323/318 |
| 2010/0198535 | A1 | 8/2010 | Brown et al. | |
| 2010/0328849 | A1 | 12/2010 | Ewing et al. | |
| 2011/0062780 | A1 | 3/2011 | Verges et al. | |
| 2011/0077788 | A1 | 3/2011 | Chan et al. | |
| 2011/0101777 | A1 | 5/2011 | Jansma | |
| 2011/0167282 | A1 | 7/2011 | Brown et al. | |
| 2012/0078429 | A1 * | 3/2012 | Weston et al. | 700/295 |

FOREIGN PATENT DOCUMENTS

CN            101707540 A       5/2010

OTHER PUBLICATIONS www.webopedia.com/TERM/queue.html, Aug. 10, 2002, www.webopedia.com, definition 2.*
Case et al, A simple network Management Protocol (SNMP), May 1990, Network Working Group.*

(Continued)

*Primary Examiner* — Jaweed A Abbaszadeh
*Assistant Examiner* — Austin Hicks
(74) *Attorney, Agent, or Firm* — Lando & Anastasi LLP (57) ABSTRACT

A system of managing power distribution units includes a master rack PDU and a plurality of child rack PDU's. The master rack PDU is coupled to a network and is configured to receive short-range wireless signals. The plurality of child rack PDU's are configured to transmit short-range wireless signals including data measurements. The master rack PDU receives the data measurements in the short-range wireless signals transmitted by the plurality of child rack PDU's and the master rack PDU transmits the data measurements to a computer over the network.

22 Claims, 4 Drawing Sheets

(56) References Cited

OTHER PUBLICATIONS

Strzelecki et al, Decentralized Control of a UPS Systems Operating in Parallel, Oct. 2008, 2008 International Biennial Baltic Electronics Conference, section 3.3 The Second Communication Channel.*

Notification of Transmittal of the International Search Report and Written Opinion of the International Searching Authority from corresponding PCT/US2012/048542 mailed Oct. 16, 2012.
Extended Supplementary European Search Report from corresponding EP 12817959.5 dated Dec. 22, 2014.

* cited by examiner

SYSTEMS AND METHODS FOR WIRELESS COMMUNICATION OF POWER DISTRIBUTION INFORMATION

BACKGROUND

Datacenters often include multiple power distribution units (PDU's) contained within equipment racks. Intelligent rack-mounted power distribution units, sometimes referred to as "rack PDU's," are typically connected to a computer or computer network. Rack PDU's generally include at least one branch input power feed, single or three phase, with multiple receptacles to power attached equipment. Rack PDU's often include metering functions to measure and calculate voltage, current, power, and environmental data as well as a processor, memory and network management device for remote communication and management. Rack PDU's may measure aggregate load data based on phases and/or breaker banks, feeding multiple receptacle outputs, or they may include metering loads at each individual receptacle output. A rack PDU may communicate the measurements with the computer or computer network to which it is connected. An exemplary rack PDU is disclosed in U.S. Pat. No. 6,741,442, which is assigned to American Power Conversion Corporation of West Kingston, R.I., the assignee of the present disclosure, which is incorporated herein by reference in its entirety for all purposes.

When a new rack PDU is added to a datacenter, physical communication cables are installed between the new rack PDU and a network and/or computer to enable the new rack PDU to share data with a computer or computer network. Additionally, an administrator spends time associating the new rack PDU with a new Internet Protocol (IP) address and connecting the new rack PDU with the computer or computer network.

SUMMARY

According to one aspect, systems and methods are provided for allowing multiple rack PDU's to wirelessly communicate with each other. According to one embodiment, systems and methods are provided for allowing multiple rack PDU's to share a single IP address via wireless communication with a master rack PDU. For example, multiple child rack PDU's may wirelessly communicate data with the master rack PDU, wherein the master rack PDU has an IP address and is connected to a computer network. The master rack PDU transmits the data from the multiple child rack PDU's to the computer network.

According to one aspect, a system of managing power distribution units including a master rack PDU and multiple child rack PDU's is provided. The master rack PDU is coupled to a network and configured to receive short-range wireless signals. The child rack PDU's are configured to transmit short-range wireless signals including data measurements. The master rack PDU is configured to receive the data measurements in the short-range wireless signals transmitted by the child rack PDU's and transmit the data measurements to a computer over the network.

According to one embodiment, the master rack PDU receives control data from the network and wirelessly transmits the control data to at least one of the child rack PDU's. According to another embodiment, a third rack PDU is configured to detect the master rack PDU and upon detection of the master rack PDU, transmit data to the master rack PDU.

In one embodiment, each of the child rack PDU's has a unique PDU identifier, and each of the child rack PDU's is configured to transmit the unique PDU identifier with the data measurements. In one example, the data measurements are power usage data measurements.

According to another embodiment, each of the child rack PDU's includes multiple power outlets and is configured to receive control data from the master rack PDU. According to one feature, a child rack PDU controls one or more of the power outlets based on the control data.

According to one aspect, a method of wireless communication in a datacenter is provided. The method includes wirelessly transmitting, from multiple child rack PDU's, a short-range signal including a set of data measurements and wirelessly receiving, by a master rack PDU, the short-range signal. Each signal includes the set of data measurements from each of the child rack PDU's. The method also includes adding a set of master rack PDU data measurements to the sets of child rack PDU data measurements, and transmitting the sets of data measurements from the master rack PDU to a network. According to one feature, each set of data measurements includes a PDU identifier.

According to one embodiment, the method also includes transmitting control data from the network to the master rack PDU, and wirelessly transmitting the control data from the master rack PDU to at least one of the child rack PDU's. According to another embodiment, the method also includes transmitting the data measurements from the master rack PDU over a serial connection to a computer. According to a further embodiment, the method also includes collecting, at the master rack PDU, the sets of PDU data measurements in a queue. According to one embodiment, the data measurements from the master rack PDU are transmitted to the network over an Ethernet connection.

According to one embodiment, the data measurements include power usage data measurements. According to various examples, the data measurements include one or more of voltage of each phase provided to each of the rack PDU's, current draw of each phase provided to each of the rack PDU's, and power draw of each phase provided to each of the rack PDU's. According to further examples, the data measurements include one or more of voltage provided to each outlet of each of the rack PDU's, current draw of each outlet of each of the rack PDU's, and power draw of each outlet of each of the rack PDU's.

According to another embodiment, the method includes coupling the master rack PDU to the network. According to one feature, when the master rack PDU is connected to the network, the child rack PDU's automatically recognize the master rack PDU as a master and begin wireless transmitting data measurements to the master rack PDU.

According to another aspect, a power distribution unit is provided, including multiple power outlets for providing outlet power, an input to receive input power from an input power source, and a controller. In a first mode of operation, the controller is configured to operate as a master controller and receive data measurements wirelessly from multiple child PDU's and transmit the data measurements to a network. In a second mode of operation, the controller is configured to operate as a child controller and wirelessly transmit data measurements to a master PDU. According to one feature, the data measurements are power usage data measurements.

According to one embodiment, in the first mode of operation, the controller is also configured to receive control data from the network and transmit the control data to one or more of the child PDU's. According to another embodiment, in the second mode of operation, the controller is further configured, to receive control data wirelessly transmitted by the master PDU, and control one or more of the power outlets based on the control data.

In another embodiment, the power distribution unit includes a unique PDU identifier and, in the second mode of operation, the controller is configured to transmit the unique PDU identifier with the data measurements. In a further embodiment, the controller is configured in the first mode of operation to receive a unique PDU identifier with the data measurements from the child PDU's and transmit each unique PDU identifier with the data measurements.

BRIEF DESCRIPTION OF THE FIGURES

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1:
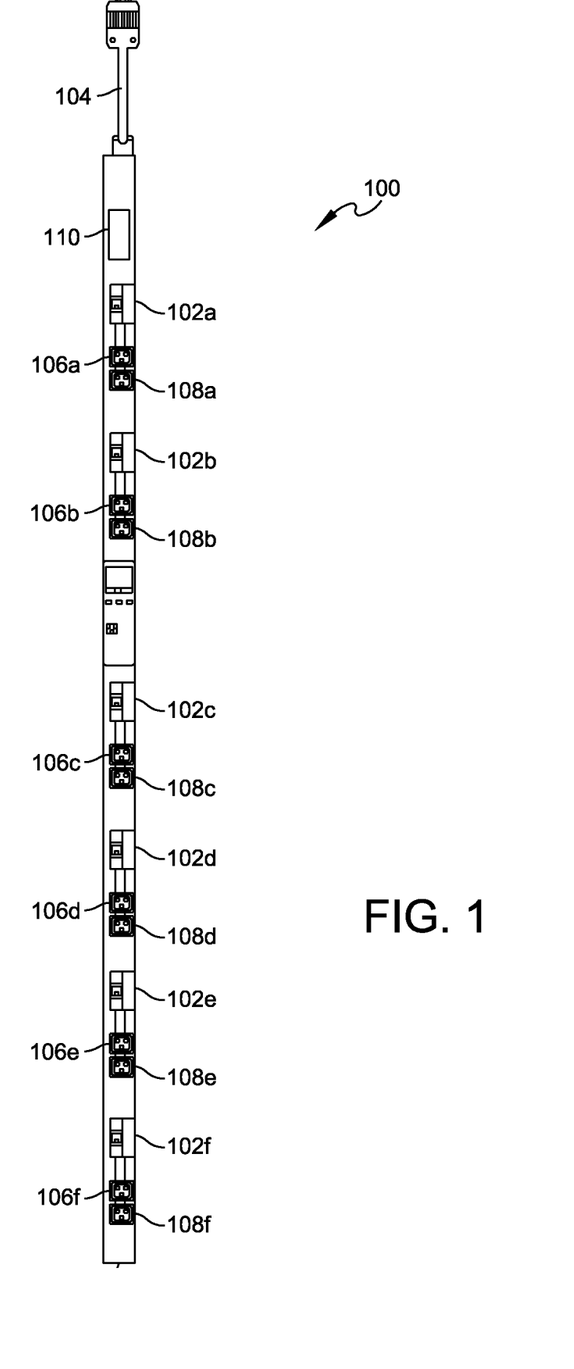
FIG. 1 is a schematic diagram of a PDU in accordance with an embodiment of the invention.

FIG. 1 illustrates a power distribution unit 100 having a vertical mount form factor suitable for mounting within a typical equipment rack (not shown). The PDU 100 may be connected to a circuit breaker. The circuit breaker feeds power to the PDU 100, which may be configured to have several sub-branch breakers 102a-102f. In the illustrative example, the input branch circuit feed 104 is a 3-phase circuit breaker, and the input branch circuit feed 104 is broken down into six sub-branch breakers 102a-102f having outlet receptacles 106a-106f and 108a-108f. According to one feature, each sub-branch circuit breaker 102a-102f of the PDU 100 is fed by two of the incoming phases and feeds one or more outlet receptacles 106a-106f and 108a-108f at 208 Volts. In the illustrative example, the six branch circuit breakers 102a-102f each have two outlet receptacles 106a-106f and 108a-108f. Thus, the PDU 100 includes twelve outlet receptacles 106a-106f and 108a-108f, which may be connected to IT loads, such as servers.

According to one feature, the PDU 100 includes sensors to monitor the power distributed to devices attached to the PDU 100. In various examples, the PDU 100 may monitor the voltage of each phase provided to the PDU 100, the current draw of each phase provided to the PDU 100, the power draw of each phase provided to the PDU 100, and environmental information such as temperature and humidity at various locations on the PDU 100. In other examples, the PDU 100 may monitor the voltage provided to each outlet receptacle 106a-106f and 108a-108f, the current draw of each outlet receptacle 106a-106f and 108a-108f, and the power draw of each outlet receptacle 106a-106f and 108a-108f. In further examples, the PDU 100 may monitor the power supply status of the PDU 100, it may monitor alarms relevant to voltage, current and other thresholds, and it may monitor the serial numbers and model numbers of equipment attached to the PDU 100.

The PDU 100 includes a controller 110 for receiving the measured data and providing the data to external data logs, software programs or computer networks. The data may be used by system administrators or other PDU users, who may use it to monitor the PDU, to monitor power consumption at the PDU and to make calculations regarding system efficiency. In some examples, users may use the data to plan future energy requirements, make decisions regarding upgrading equipment, and determine reliability of the system.

According to one aspect, installing the PDU 100 includes configuring a set of information. For example, upon installing the PDU 100, an administrator may calibrate the unit, configure alarm thresholds, establish unit identification, configure outlet scheduling, and set the on/off status to individual outlets.

In some embodiments, multiple rack PDU's are installed in a datacenter, and the rack PDU's are connected so they can communicate with each other. For example the rack PDU's may be connected using wired Controller Area Network (CAN) communication. For wired connections between PDU's, a user has physical access to the wiring for each unit. Furthermore, if each PDU is connected to the network individually, each PDU is set up with its own IP address.

Figure 2:
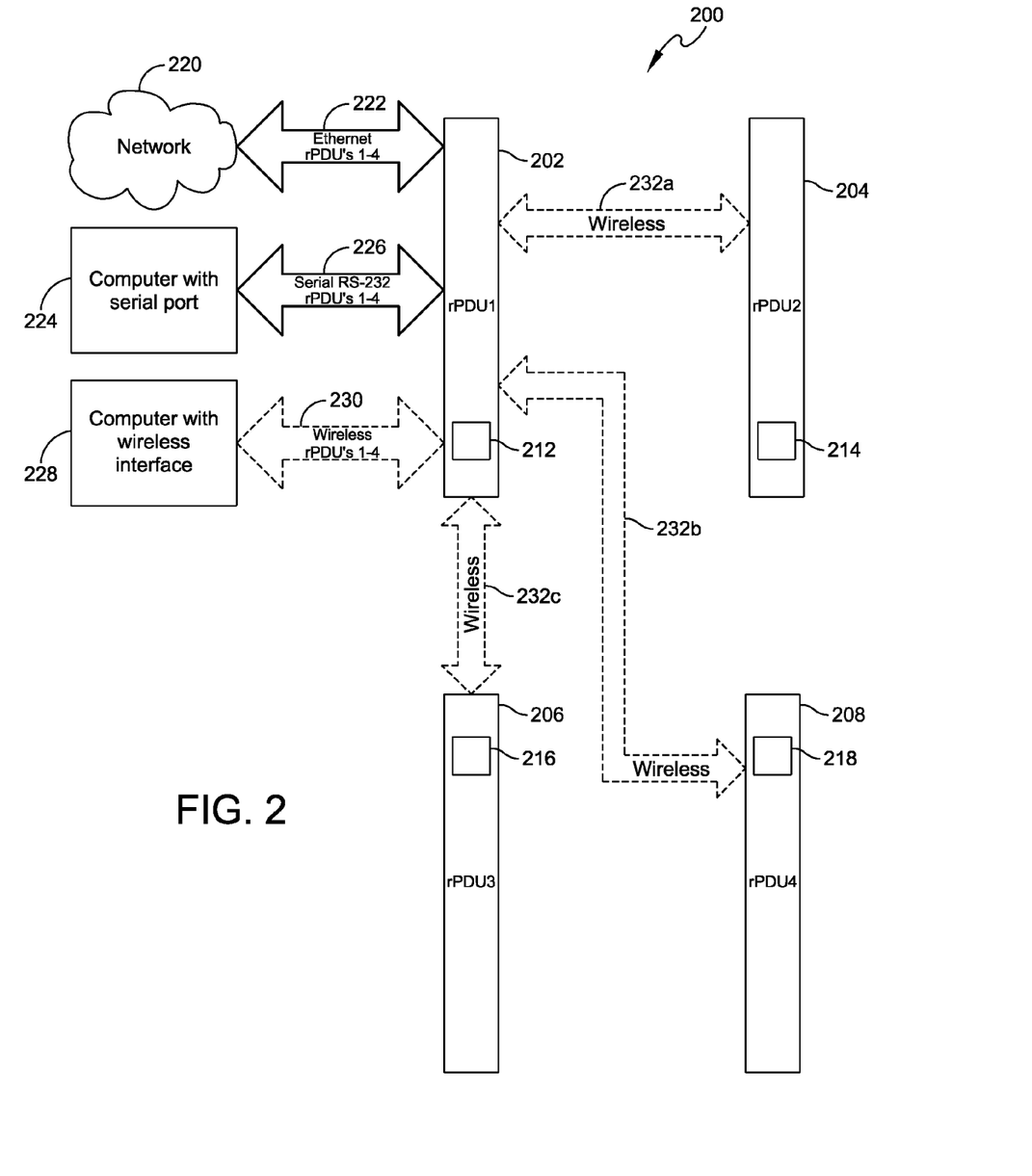
FIG. 2 is a schematic diagram of a system including multiple rack PDU's in accordance with an embodiment of the invention.

FIG. 2 is a schematic diagram of a system 200 including first 202, second 204, third 206 and fourth 208 rack PDU's, wirelessly connected via connections 232a-232c, according to an embodiment of the invention. In the illustrative example of FIG. 2, the first rack PDU 202 is the master rack PDU. The first rack PDU 202 is connected to a computer network 220 via an Ethernet connection 222, and the first rack PDU 202 is connected to a computer with a serial port 224 via a serial connection 226. In one example, the serial connection 226 is a RS-232 standard connection. The first rack PDU 202 is also connected wirelessly via a wireless link 230 to a computer 228 with a wireless interface. In other embodiments, the first rack PDU 202 is connected to one of the computer network 220, the computer with a serial port 224 and the computer 228 with a wireless interface. In other embodiments, the first rack PDU 202 is connected to two of the computer network 220, the computer with a serial port 224 and the computer 228 with a wireless interface. In one embodiment, there is one computer 224, 228 that includes a serial port and a wireless interface.

As shown in FIG. 2, the first rack PDU 202 is also wirelessly connected to the second 204, third 206 and fourth 208 rack PDU's through wireless connections 232a-232c. According to one feature, the wireless connections 232a-232c between the first rack PDU 202 and the second 204, third 206 and fourth 208 rack PDU's, allow the second 204, third 206 and fourth 208 rack PDU's to communicate, through the first rack PDU 202, with the network 220, the computer with the serial port 224 and the computer with the wireless interface 228. According to one feature, the second 204, third 206 and fourth 208 rack PDU's may communicate with the network 220 and the computers 224 and 228 without having individual IP addresses. The second 204, third 206 and fourth 208 rack PDU's may each have a unique device identification number, which is included with any data the rack PDU transmits. According to one embodiment, the first rack PDU 202 receives data including the unique device identification number from the second 204, third 206 and fourth 208 rack PDU's. The first rack PDU 202 sends out the data it receives from the second 204, third 206 and fourth 208 rack PDU's to one or more of the network 220, the computer 224 and the computer 228. In some embodiments, the first rack PDU 202 saves data received from the second 204, third 206 and fourth 208 rack PDU's in a queue before transmitting it to the network 220, computer 224 or computer 228. According to one feature, first rack PDU 202 has an IP address, and the data from the second 204, third 206 and fourth 208 rack PDU's is transmitted through the first rack PDU 202, using the IP address of the first rack PDU 202.

According to one embodiment, the first rack PDU 202 may also transmit commands from the network 220 or the computers 224 and 228 to the second 204, third 206 and fourth 208 rack PDU's. According to one feature, the first 202, second 204, third 206 and fourth 208 rack PDU's each have a unique device identification number, allowing each rack PDU to be individually identified on the network. Thus, a user can identify a selected rack PDU through the first rack PDU 202 and configure settings on the selected rack PDU.

The wireless connection between the first rack PDU 202 and the second 204, third 206 and fourth 208 rack PDU's may be a low power, short range wireless interface. For example, the radio communication may have a range of about two feet, about three feet, about one meter, about two meters, about three meters, about four meters, or about five meters. According to one feature, using low power, short range wireless communication signals reduces interference with other equipment which may be present in a datacenter. Additionally, low power, short range wireless communication may be inexpensive to implement since it may be implemented using simple radio circuitry.

According to another embodiment, the short-range wireless interface connecting the first 202, second 204, third 206 and fourth 208 rack PDU's may be a dedicated wireless interface device installed in each rack PDU. In another embodiment, a wireless dongle with a short-range wireless interface is installed in one or more of the first 202, second 204, third 206 and fourth 208 rack PDU's. In one example, a portable computer including a short-range wireless interface, such as the computer 228, communicates with the master rack PDU to receive information from the first 202, second 204, third 206 and fourth 208 rack PDU's may be a portable computer. In another example, a wireless dongle with a short-range wireless interface is attached to the USB port of the computer with the wireless interface 228 to facilitate communication with the master rack PDU.

The wireless communications between the first 202, second 204, third 206 and fourth 208 rack PDU's utilize a low voltage, wireless communication standard. In one example, the wireless communication protocol is IEEE standard 802.15.4. In another example, the wireless communication protocol is ZigBee®. In another example, the wireless communication protocol is Bluetooth. In a further example, the wireless communication protocol is the Texas Instruments SimpliciTI™ protocol. In other examples, the wireless communication protocol may be a similar simple protocol. According to one feature, wireless transmission rates between rack PDU's may be about 500 kbps, about 1.0 Mbps, or between about 500 kbps and 1.0 Mbps.

According to one embodiment, the radio network between rack PDU's may use a Star network topology. In a Star network topology, one rack PDU is the master rack PDU, and all other rack PDU's in the network communicate directly with the master rack PDU. According to another embodiment, the radio network between rack PDU's may use a Mesh network topology. In a Mesh network topology, not every rack PDU in the network communicates directly with the master rack PDU. In a Mesh network, one or more rack PDU may communicate with one or more interim rack PDU's which then relay all the data they receive to the master rack PDU.

According to one embodiment, the rack PDU's 202, 204, 206 and 208 include controllers 212, 214, 216 and 218. The first rack PDU 202 includes a first controller 212, the second rack PDU 204 includes a second controller 214, the third rack PDU 206 includes a third controller 216, and the fourth rack PDU 208 includes a fourth controller 218. The controllers 214, 216 and 218 collect the data measured in the rack PDU's 204, 206 and 208, respectively, and transmit the information to the first rack PDU 202. The controller 212 in the first rack PDU 202 receives the data from the second 214, third 216 and fourth 218 controllers and transmits it, as well as the data it received from the first rack PDU 202, to the network 220 and computers 224 and 228.

According to one embodiment, the first 202, second 204, third 206 and fourth 208 rack PDU's are identical, and the wireless interface of each rack PDU operates in the same way. A user may determine which rack PDU becomes the master PDU simply by connecting the selected PDU to a computer or network. When one rack PDU is connected to a computer or network, the other rack PDU's automatically become child PDU's and begin wirelessly interfacing with the master PDU to send their data to the computer or network.

According to one aspect, wireless communication among multiple rack PDU's will simplify administration of the rack PDU's by the end user. According to one feature, once multiple wireless rack PDU's are powered on in close proximity to each other, the PDU's automatically create a network amongst themselves. Only one of the PDU's may be connected to a computer or computer network, yet all the PDU's in the network may be automatically configured by the end user using that connection. A user may add a rack PDU to the wireless PDU network simply by plugging it in within the range of the network. The user may add the rack PDU without configuring a new IP address for the rack PDU or physically wiring it to the other PDU's or the network.

Figure 3:
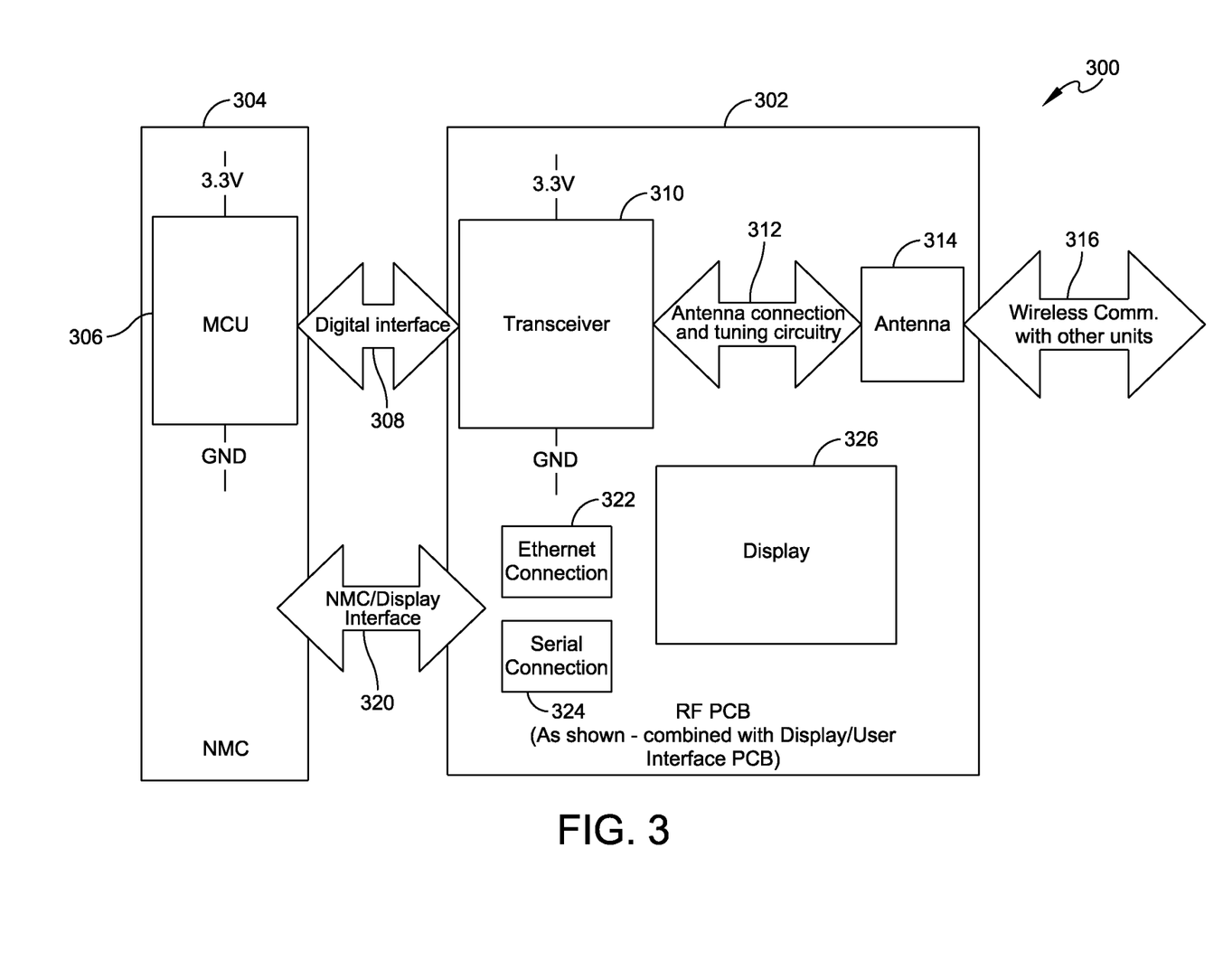
FIG. 3 is a block diagram of a rack PDU wireless communication circuit in accordance with an embodiment of the invention.

FIG. 3 is a block diagram of a rack PDU wireless communication circuit 300 including a radiofrequency circuit board 302 and a network management card (NMC) 304 including a controller unit 306 that is installed in a rack PDU, such as the rack PDU 100 of FIG. 1, according to an embodiment of the invention. The controller unit 306 collects data measured in the rack PDU, and sends the data over a digital interface 308 to a transceiver 310. According to one feature, the controller unit 306 is an integrated circuit, and in one example, it is a Rhodes ASIC. The transceiver 310 transmits the data over antenna connection and tuning circuitry 312 to an antenna 314. The antenna 314 wirelessly transmits the data to other rack PDU's.

According to one embodiment, the rack PDU wireless communication circuit 300 is installed in a master rack PDU, which is connected to one or more of a network and a computer, such as the first rack PDU 202 of FIG. 2. In a master rack PDU, the antenna 314 also wirelessly receives data from other rack PDU's and transmits the data over the antenna connection and tuning circuitry 312 to the transceiver 310. The transceiver 310 sends the received data over the digital interface 308 to the controller unit 306, which is in the NMC 304. The NMC 304 sends data over the NMC/display interface 320 to the Ethernet connection 322 and the serial connection 324. In some embodiments, the data is displayed on an LCD display 326. The LCD display 326 may display data from the rack PDU in which it is installed, and it may also display data from other rack PDU's from which it is wirelessly receiving data.

According to one feature, the NMC 304 connects the rack PDU to a network if a network is available. Referring to FIG. 2, the first rack PDU 202 is connected to the network 220 via the Ethernet connection 222 and the computer 224 via the serial connection 226. The second 204, third 206 and fourth 208 rack PDU's are not directly connected to the network 220 or the computer 224, although they may have the circuitry 300, including a NMC 304.

According to another embodiment, the rack PDU wireless communication circuit 300 is installed in a child rack PDU, which is not directly connected to a network or a computer, such as the second 204, third 206 and fourth 208 rack PDU's of FIG. 2. In a child rack PDU, when the antenna 314 wirelessly receives data from other child rack PDU's, it transmits the data over the antenna connection and tuning circuitry 312 to the transceiver 310, which then retransmits the data back through the antenna connection and tuning circuitry 312 for wireless transmission to other rack PDU's, such as the master rack PDU.

According to one embodiment, the transceiver 310 is a low power transceiver, and in one example, the transceiver 310 is a 2.4 GHz radiofrequency transceiver. In other examples, the transceiver 310 may use a different radiofrequency. In one example, the size of the transceiver 310 circuitry about is 7 mm×7 mm, and it may be less than about 7 mm×7 mm In one example, the transceiver is a QFN-48 circuit.

According to another embodiment, the antenna 314 is external to the radiofrequency circuit board 302. In another embodiment, the antenna 314 is a printed circuit board (PCB) antenna. According to one embodiment, the radiofrequency circuit board 302 is enclosed in a housing and the antenna is a PCB antenna, and the PCB antenna is mounted near an opening in the housing. In one example, the antenna is printed on a 26 mm×8 mm printed circuit board. In other examples, the antenna may be printed on a circuit board having any selected size.

According to one feature, the rack PDU wireless communication circuit 300 may use frequency agility in the wireless interface 316 between one rack PDU and another. Frequency agility is the ability to quickly shift the operating frequency of the wireless interface 316. According to one feature, frequency agility may allow for robust communication in environments that may have radio noise from other sources.

According to another feature, automated channel selection logic may be employed to allow multiple groups of rack PDU clusters to operate independent from one another. Using automated channel selection logic, the rack PDU's in a cluster may communicate with each other over a selected channel without receiving data from rack PDU's in other clusters, which are using different selected channels.

According to one aspect, rack PDU's including wireless communication circuitry may include an automatic configuration option. Under this option, when one wireless rack PDU is placed in close proximity to another wireless rack PDU, automatic configuration begins. The wireless rack PDU's identify each other, verify the authorization of the other device, determine communication parameters, and begin data transmission. According to one feature, the wireless rack PDU that has one or more of a serial, Ethernet or wireless computer connection will become the master rack PDU. According to one embodiment, a wireless rack PDU that has one or more of a serial, Ethernet or wireless computer connection will not send data to other wireless rack PDU's. According to another embodiment, if more than one wireless rack PDU has one or more of a serial, Ethernet or wireless computer connection, an unconnected wireless rack PDU will communicate with the connected wireless rack PDU it identifies first. According to another embodiment, if more than one wireless rack PDU has one or more of a serial, Ethernet or wireless computer connection, an unconnected wireless rack PDU will communicate with the connected wireless rack PDU that is physically closest to it and has the strongest wireless signal. According to a further embodiment, if more than one wireless rack PDU has one or more of a serial, Ethernet or wireless computer connection, an unconnected wireless rack PDU will communicate with all connected wireless rack PDU's it identifies.

According to one embodiment, a user manually selects which rack PDU's wirelessly communicate with each other. The user may use a wireless interface to select which rack PDU's communicate with each other. According to one example, a user may override automatic configuration of rack PDU wireless communication networks. According to another example, automatic configuration of rack PDU wireless communication networks may be disabled. In one example, a user may select which rack PDU's communicate with the master rack PDU. In an example with multiple master rack PDU's, a user may select which master rack PDU each child rack PDU communicates with.

According to one embodiment, the wireless communication capability may be built into rack PDU's as a standard feature. According to another embodiment, a user may be able to remotely configure the settings of a wireless rack PDU. For example, a user may be able to remotely establish alarm thresholds and outlet switching on wireless rack PDU's.

Figure 4:
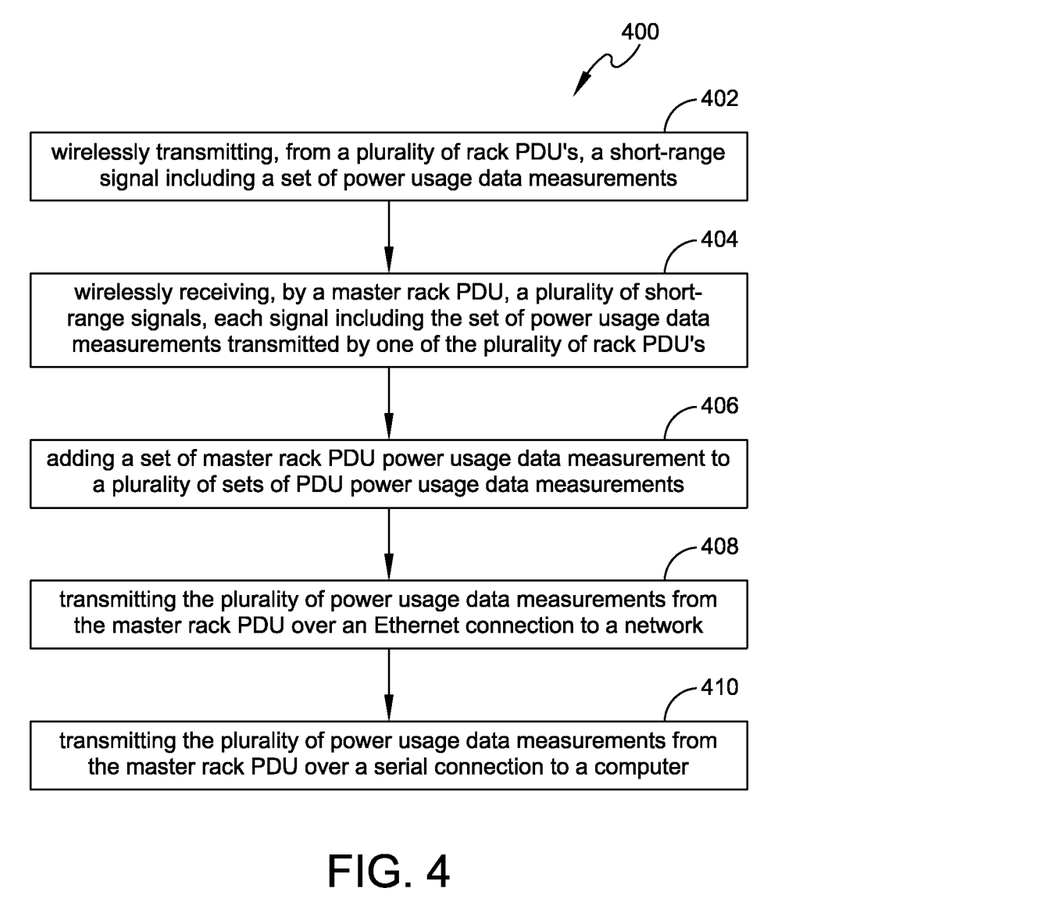
FIG. 4 shows a flow chart of a method of wirelessly communicating data between rack PDU's in accordance with an embodiment of the invention.

FIG. 4 shows a flow chart of a method 400 of wirelessly communicating data between rack PDU's in accordance with an embodiment of the invention. At block 402, multiple rack PDU's each wirelessly transmit a short-range signal including a set of data measurements. The data measurements may be power usage data measurements. At block 404, the short-range signals, each including a set of data measurements, are wirelessly received by a master rack PDU. At block 406, the master rack PDU adds its set of data measurements to multiple sets of data measurements. At block 408, the master rack PDU transmits the multiple sets of data measurements from the master rack PDU over an Ethernet connection to a network. At block 410, the master rack PDU transmits the multiple sets of data measurements from the master rack PDU over a serial connection to a computer. According to one feature, each of the plurality of data measurements includes a PDU identifier.

According to one embodiment, the master rack PDU transmits data from other PDU's as it receives the data. In other embodiments, the master rack PDU collects data in a queue before transmitting it. The queue may be a first-in-first-out (FIFO) queue. In one example, the child rack PDU's collect a selected amount of data before transmitting it to the master rack PDU.

According to one embodiment, the wireless communications between the rack PDU's is a short-range, low power wireless signal. The wireless communication between the rack PDU's may use a low voltage, wireless communication standard. In one example, the wireless communication protocol is IEEE standard 802.15.4. In another example, the wireless signal is a radiofrequency signal. In another example, the wireless communication protocol is ZigBee®. In another example, the wireless communication protocol is Bluetooth. In a further example, the wireless communication protocol is the Texas Instruments SimpliciTI™ protocol. In other examples, the wireless communication protocol may be a similar simple protocol. According to one feature, wireless transmission rates between rack PDU's may be about 500 kbps, about 1.0 Mbps, or between about 500 kbps and 1.0 Mbps.

As noted above, in addition to a wireless transceiver for communicating with other rack PDU's, an exemplary rack PDU may include embedded sensors to measure power data, a network management device to communicate with external devices including other rack PDU's, and computer processing to perform calculations on the measured and collected data. In certain embodiments, the rack PDU may include an embedded display or communication ports to communicate to an attached display to output the information calculated to the user.

In certain embodiments, the rack PDU measures and records current, voltage, and power calculations by aggregate banks by phase and/or breaker bank. Some rack PDU's may also be configured to measure these attributes for each individual outlet and may add these individual data points to calculate the aggregate breaker bank and/or phase loads. This data may be recorded in a local memory file at some configurable time range. The rack PDU may also, in certain embodiments, use network communication protocols to communicate with external devices and/or software to collect necessary data as input for calculations. The rack PDU may be configured to record any of these data records as input to the mathematical algorithms to optimize the configuration and output recommendations to the user. The rack PDU may be further configured to include new processing routines that are embedded in the rack PDU to take the measurement data including real time, memory logged, and/or external data inputs as input to the process to make calculations and output the recommendations described above via the network management card and/or the user display interface.

The systems and methods disclosed herein may be utilized on any power distributing device having multiple groups of circuit breakers or single or three phase power input with single phase power output.

Thus, it should be observed that the systems and methods disclosed herein may provide an automated, easy to use, on location (e.g., by providing the display at the rack PDU) set of embedded calculations, comparisons and associated recommendations for the user to maximize efficiency and increase system reliability. Embodiments may include a customer configurable set of variables and/or limits to consider in performing the automated calculations in order to provide customer the maximum flexibility in using the automated tools in a way that matches their desired level of safety. The systems and methods may further provide comprehensive checks of available power, consider historic and/or real-time (i.e., maximum and/or average loading information) data, and consider power source losses in redundant systems, as well as the user configurable maximum load thresholds to ensure the user or operator configures attached loads for maximum robustness and conformity to the user policy preferences to minimize probability of overload and dropped loads.

The embedded algorithms and calculations of data disclosed herein may be configured to provide recommendations for optimal configuration of power connections of attached equipment and other recommendations as described herein. Embodiments may include utilizing communication methods from external devices. Such external devices may include other rack PDU's, other hardware (e.g., remote power panels or feeder PDU's), and/or other external software, such as APC Infrastruxure Central offered by American Power Conversion Corporation of West Kingston, R.I., or third party applications, and processing of this data embedded into the rack PDU itself to provide user recommendations and/or calculated data based on the external information and the data collected within the rack PDU itself. Embodiments further include a display built into the rack PDU, such as LCD, LED, or other type of display, and any associated user interface which may be interactive to display these recommendations real time to a user at the rack PDU. Alternative embodiments may include an optional external display connected directly to the rack PDU, such as LCD, LED, or other type of display, and any associated user interface which may be interactive to display these recommendations real-time to a user at the rack PDU. Methods to transmit this data to remote locations via the embedded web interface, SNMP, serial, or any other communication method of the information processed in the rack PDU to other devices may further be provided.

In certain embodiments, the measurements may be logged in an embedded memory of a network management card of the PDU, for example, for data analysis purposes. Operators may utilize the measurement data, particularly the current and power data, in order to achieve certain performance improvements. For example, such measurement data may be used to monitor the current draw to avoid circuit overloads. Another use for measurement data may be to track power usage for capacity or cooling planning.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, alternative configurations of electrical components may be utilized to produce similar functionality, for example, transceiver functions, or other functions. Accordingly, the foregoing description and drawings are by way of example only.

What is claimed is:

1. A system of managing power distribution units comprising:
    a master rack Power Distribution Unit (PDU) coupled to a network and including an input to receive power, at least one output to provide power, and a port connected to the network, the master rack PDU being configured to receive short-range wireless signals; and
    a plurality of child rack PDU's each including an input to receive power, at least one output to provide power, and a port, each of the plurality of child rack PDU's being configured to operate as a child rack PDU responsive to an absence of a connection to the network via the port and to transmit short-range wireless signals including data measurements;
    wherein the master rack PDU is configured to operate as the master rack PDU responsive to the port being connected to the network, receive the data measurements in the short-range wireless signals transmitted by the plurality of child rack PDU's, and transmit the data measurements to a computer over the network via the port.

2. The system of claim 1, wherein the master rack PDU receives control data from the network and wirelessly transmits the control data to at least one of the plurality of child rack PDU's.

3. The system of claim 1, further comprising a third rack PDU configured to determine if the third rack PDU is coupled to a computer or network, and if the third rack PDU is coupled to a computer or network, establish the third rack PDU as another master rack PDU and couple wirelessly to one of the plurality of child rack PDU's, and if not, detect the master rack PDU and upon detection of the master rack PDU, transmit data to the master rack PDU.

4. The system of claim 1, wherein each of the plurality of child rack PDU's has a unique PDU identifier, and wherein each of the plurality of child rack PDU's is configured to transmit the unique PDU identifier with the data measurements.

5. The system of claim 1, wherein the data measurements are power usage data measurements.

6. The system of claim 2, wherein the each of the plurality of child rack PDU's includes a plurality of power outlets and is configured to receive control data from the master rack PDU and control at least one of the plurality of power outlets based on the control data.

7. A method of wireless communication in a datacenter having a plurality of Power Distribution Units (PDU's) each including an input to receive power, an output to provide power, and a port to couple to a network, the method comprising:
  identifying a PDU from the plurality of PDU's with a connection to the network via the port;
  designating the identified PDU as a master rack PDU;
  identifying two or more PDU's from the plurality of PDU's with an absence of a connection to the network via the port;
  designating the two or more identified PDU's as a plurality of child rack PDU's;
  wirelessly transmitting, from the plurality of child rack PDU's of the plurality of PDU's, a short-range signal including a set of data measurements;
  wirelessly receiving, by the master rack PDU, the short-range signal, each signal including the set of data measurements from each of the plurality of child rack PDU's;
  adding a set of master rack PDU data measurements to a plurality of sets of child rack PDU data measurements; and
  transmitting the plurality of sets of data measurements from the master rack PDU to the network via the port.

8. The method of claim 7, wherein each set of the plurality of sets of data measurements includes a PDU identifier.

9. The method of claim 7, further comprising:
  transmitting control data from the network to the master rack PDU; and
  wirelessly transmitting the control data from the master rack PDU to at least one of the plurality of child rack PDU's.

10. The method of claim 7, further comprising transmitting the plurality of data measurements from the master rack PDU over a serial connection to a computer.

11. The method of claim 7, further comprising collecting, at the master rack PDU, the plurality of sets of PDU data measurements in a queue.

12. The method of claim 7, wherein the data measurements include power usage data measurements.

13. The method of claim 12, wherein the data measurements include at least one of voltage of each phase provided to each of the plurality of rack PDU's, current draw of each phase provided to each of the plurality of rack PDU's, and power draw of each phase provided to each of the plurality of rack PDU's.

14. The method of claim 12, wherein the data measurements include at least one of voltage provided to each outlet of each of the plurality of rack PDU's, current draw of each outlet of each of the plurality of rack PDU's, and power draw of each outlet of each of the plurality of rack PDU's.

15. The method of claim 7, wherein the plurality of data measurements from the master rack PDU is transmitted to the network over an Ethernet connection.

16. The method of claim 7, further comprising coupling the master rack PDU to the network, and wherein the plurality of child rack PDU's automatically recognize the master rack PDU as a master when the master rack PDU is connected to the network.

17. A power distribution unit (PDU), comprising:
  a plurality of power outlets for providing outlet power;
  an input to receive input power from an input power source;
  a port to connect to a network; and
  a controller, configured, in a first mode of operation, to operate as a master controller and receive data measurements wirelessly from each of a plurality of child PDU's and transmit the data measurements to the network, and configured, in a second mode of operation, to operate as a child controller and wirelessly transmit data measurements to a master PDU, wherein the controller is further configured to operate in the first mode of operation upon detection of a connection to the network via the port, and to operate in the second mode of operation upon detection of an absence of a connection to the network via the port.

18. The power distribution unit of claim 17, wherein the controller is further configured, in the first mode of operation, to receive control data from the network and transmit the control data to at least one of the plurality of child PDU's.

19. The power distribution unit of claim 17, wherein the controller is further configured, in the second mode of operation, to receive control data wirelessly transmitted by the master PDU, and control at least one of the plurality of power outlets based on the control data.

20. The power distribution unit of claim 17, wherein the power distribution unit includes a unique PDU identifier and, in the second mode of operation, the controller is configured to transmit the unique PDU identifier with the data measurements.

21. The power distribution unit of claim 17, wherein the controller is configured in the first mode of operation to receive a unique PDU identifier with the data measurements from the plurality of child PDU's and transmit each unique PDU identifier with the data measurements.

22. The power distribution unit of claim 17, wherein the data measurements are power usage data measurements.

* * * * *